March 31, 1942. F. W. ARNOLD ET AL 2,278,034
NON-CLOGGING, SELF-CLEANING, AUTOMATIC TRAP FOR SINKS, LAVATORIES, ETC
Filed April 21, 1941
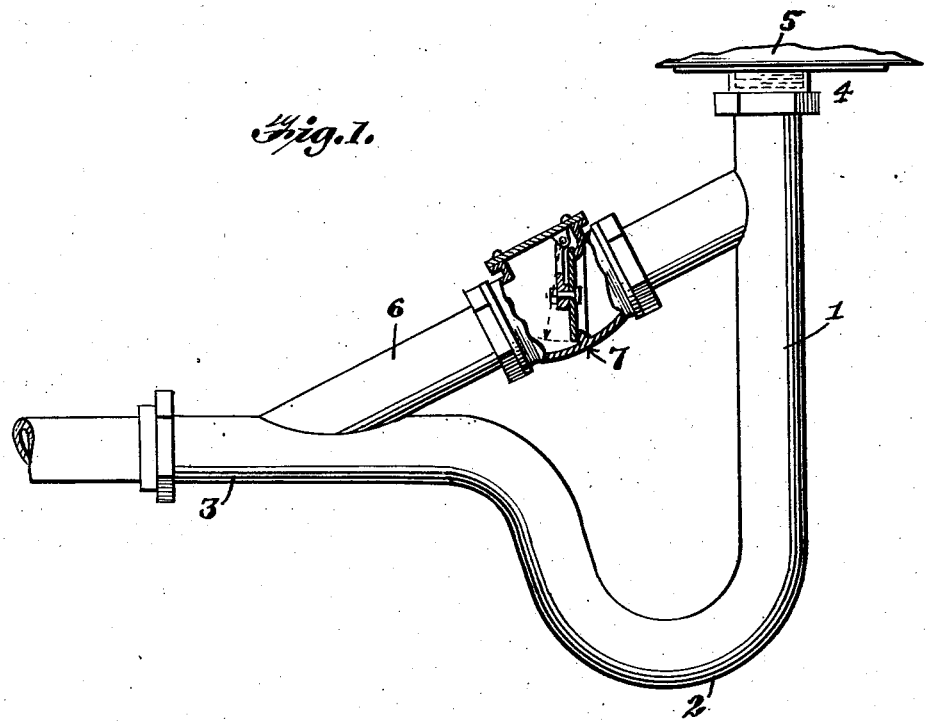
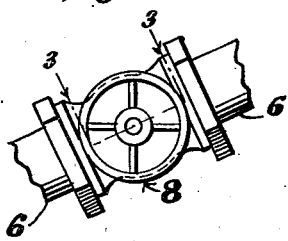
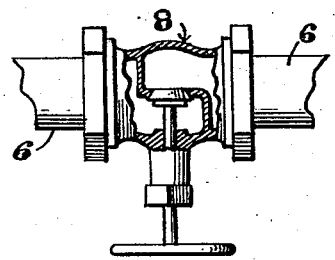
Inventors,
FLOYD W. ARNOLD AND
LOUIS J. RICHARDS.
By E. E. Vrooman & Co,
Their Attorneys.

Patented Mar. 31, 1942

2,278,034

UNITED STATES PATENT OFFICE 2,278,034

NONCLOGGING, SELF-CLEANING AUTOMATIC TRAP FOR SINKS, LAVATORIES, ETC.

Floyd W. Arnold and Louis J. Richards, Azusa, Calif.

Application April 21, 1941, Serial No. 389,666

3 Claims. (Cl. 182—14)

This invention relates to a non-clogging, self-cleaning automatic trap for sinks, lavatories, etc.

An object of the invention is the construction of a trap which is provided with novel means whereby when the same becomes clogged or filled with grease or other material, or when the drain begins to operate slowly, all that is necessary to do is to open the hot or cold faucet and let water run for a short time which will result in the trap unit of the device being cleaned, by reason of the obstruction passing to the sewer or cesspool.

Another object of the invention is the construction of a novel automatic trap, wherein valve means automatically open to allow of a cleaning flow of water to be utilized in creating a suction that will remove the foreign substance in the trap unit, allowing the trap to again function with efficiency.

A still further object of the invention is to provide entirely between the ends of an oblique unit of the trap valve means which will normally prevent sewer gas from passing out of the trap during its free functioning, but when the trap becomes clogged the valve means will either automatically or manually operate for permitting liquid to be passed downwardly through the oblique unit to cleanse the trap of the obstructing foreign substance therein.

With the foregoing and other objects in view, the invention comprises certain novel constructions, combinations, and arrangements of parts as will be hereinafter fully described, illustrated in the accompanying drawing, and more particularly pointed out in the appended claims.

In the drawing:

Figure 1 is a view partly in section and partly in side elevation of a device constructed in accordance with the present invention.

Figure 2 is a fragmentary view in elevation of the device, showing a manually-operated shut-off valve.

Figure 3 is a sectional view taken on line 3—3, Figure 2, and looking in the direction of the arrows.

Referring to the drawing in which the preferred embodiment of the invention is shown in Figure 1, I comprises the vertical unit which is integral at its lower portion with the inner end of a downwardly-bowed trap unit 2, and this downwardly-bowed trap unit is also integral at its outer end with the horizontal unit 3. The upper end of the vertical unit I is provided at 4 with the usual coupling means for attaching the device to a sink 5, or other similar fixture. An oblique unit 6 is above said trap unit 2 and is integral at its upper end with the vertical unit I, whereas its lower end is integral with the horizontal unit 3. Placed entirely between the ends of the oblique unit is valve means 7. In Figure 1 the valve means 7 is of the common type of a flap valve, whereas in the disclosures in Figures 2 and 3 the valve means 8 is a manually-operated shut-off structure. The flap valve of the valve means 7 of Figure 1 operates automatically, whereas the valve means 8 in Figures 2 and 3 must be manually operated to rotate the valve to its closed or opened position, as the operator desires.

Referring to Figure 1, when the trap unit 2 is unobstructed the liquid will pass freely through the same, but when said trap unit becomes clogged by too much grease, or other foreign substances, then the operator can flush the device by any suitable means which will result in the flushing liquid, such as hot water, passing swiftly through the oblique unit 6 and into the horizontal unit 3, resulting in a suction being created in the horizontal unit 3 at the lower end of the oblique unit 6 which will draw the obstructing material from the trap unit 2, thereby thoroughly and efficiently cleaning the device.

Normally the flap valve of Figure 1 remains closed, in the position shown, preventing sewer gas from passing upward into the sink 5, or other fixtures. But just as soon as stoppage occurs in the trap unit 2, or when the operator observes that the flow is slowing, then the flushing water can be deposited in the vertical unit I, whereby it will flow freely to the oblique unit, past the open flap valve of the valve means 7. Hence, this is an automatic structure.

If it is desired, the manually-operated means 8 can be utilized. Hence, we have shown that different types of valve means can be employed on the oblique unit, for preventing gas, such as sewer gas, from passing upward through the device.

It is to be noted that the mechanical elements constituting this invention are arranged in a compact manner, and that the only additional element needed to produce an efficient cleaning action is the liquid or water that is permitted to pass into the upper end of the vertical unit I. Further, we have not specifically described the parts of the common valve devices, designated as valve means 7 and 8, because they are known to the art and further, if the operator or constructor so desires, even different type of valve means may be employed without departing from the spirit and scope of this invention. Any suitable material may be employed in constructing the parts or elements of the device.

It is to be understood that the word "unit" is used in this specification and claims in a broad sense, meaning a pipe, conduit or similar construction.

While we have described the preferred embodiments of our invention and illustrated the same in the accompanying drawing, certain changes or alterations may appear to one skilled in the art to which this invention relates during the extensive manufacture of the same, and we, therefore, reserve the right to make such changes or alterations as shall fairly fall within the scope of the appended claims.

What we claim is:

1. In a device of the class described, the combination of a downwardly-bowed trap unit being provided only at its inner end with a vertical unit and at its outer end with a horizontal unit, an oblique unit above the entire downwardly-bowed trap unit, valve means on said oblique unit, and said oblique unit connected at its upper end to said vertical unit and at its lower end to said horizontal unit, whereby a suction action is created at the meeting portions of said horizontal and oblique units for removing foreign substances from the whole length of said bowed trap unit.

2. In a device of the class described, the combination of a downwardly-bowed pipe provided only at its inner end with a vertical pipe and at its outer end with a horizontal pipe, an inclined pipe provided intermediate its ends with a flat valve, said inclined pipe above the downwardly bowed pipe, and said inclined pipe connected at its upper end to said vertical pipe and at its lower end to said horizontal pipe, whereby a suction action is created at the meeting portions of said horizontal and inclined pipes for removing foreign substances from the whole length of said downwardly-bowed pipe.

3. In a device of the class described, the combination of a downwardly-bowed trap unit being provided only at its inner end with a vertical unit and at its outer end with a horizontal unit, a unit provided with means for preventing passage of sewer gas above the entire downwardly-bowed trap unit, and said gas-passage preventing unit connected at one end to said vertical unit and at its other end to said horizontal unit, whereby a suction action is created at the meeting portions of said horizontal and gas-passage preventing units for removing foreign substances from the whole length of said bowed trap unit.

FLOYD W. ARNOLD.
LOUIS J. RICHARDS.